(12) United States Patent
Franzen (10) Patent No.: US 7,937,849 B2
(45) Date of Patent: May 10, 2011

(54) CONCENTRICITY SENSOR AND METHODS OF USE AND APPLICATION

(75) Inventor: Patrick L. Franzen, Everett, WA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 12/384,610

(22) Filed: Apr. 6, 2009

(65) Prior Publication Data
US 2010/0251558 A1 Oct. 7, 2010

(51) Int. Cl.
*G01B 5/20* (2006.01)
(52) U.S. Cl. .............................. 33/550; 33/543; 33/555.1
(58) Field of Classification Search .................... 33/550, 33/542, 543, 544, 520, 533, 555.1, 555.2, 33/544.5, 544.6
See application file for complete search history.

(56) References Cited

U.S. PATENT DOCUMENTS

| | | | | |
|---|---|---|---|---|
| 2,095,405 A | * | 10/1937 | Ruf et al. ...................... | 33/544.6 |
| 2,302,355 A | * | 11/1942 | Sumner ........................ | 33/544.6 |
| 2,325,299 A | * | 7/1943 | Bench et al. ................. | 33/544.6 |
| 3,026,622 A | * | 3/1962 | Croshier et al. ............. | 33/544.5 |
| 3,808,696 A | * | 5/1974 | Possati ......................... | 33/544.5 |
| 3,823,484 A | * | 7/1974 | Dunn ............................ | 33/560 |
| 4,087,918 A | * | 5/1978 | Schmid et al. ............... | 33/542 |
| 4,383,368 A | * | 5/1983 | Morawski et al. ........... | 33/529 |
| 4,473,956 A | * | 10/1984 | Voinescu ..................... | 33/544.6 |
| 4,521,968 A | * | 6/1985 | Wiltermood et al. ........ | 33/542 |
| 4,571,839 A | * | 2/1986 | Burton ......................... | 33/560 |
| 4,711,037 A | * | 12/1987 | Saadat ......................... | 33/520 |
| 4,754,551 A | * | 7/1988 | Scott ............................ | 33/543 |
| 5,065,524 A | * | 11/1991 | Langowski et al. .......... | 33/544.2 |
| 5,259,121 A | * | 11/1993 | Possati et al. ................ | 33/542 |
| 5,359,781 A | | 11/1994 | Melville | |
| 6,270,322 B1 | | 8/2001 | Hoyt | |
| 6,338,203 B1 | | 1/2002 | Strickland | |
| 6,380,505 B1 | | 4/2002 | Stoops et al. | |
| 6,553,682 B1 | | 4/2003 | Willoughby | |
| 6,987,388 B2 | | 1/2006 | Oguri | |
| 7,412,778 B2 | * | 8/2008 | Golinelli ...................... | 33/543 |
| 7,458,168 B2 | * | 12/2008 | Furukawa ..................... | 33/543 |
| 7,581,330 B1 | * | 9/2009 | Redmond ..................... | 33/611 |

* cited by examiner

*Primary Examiner* — Yaritza Guadalupe-McCall
(74) *Attorney, Agent, or Firm* — Armstrong Teasdale LLP (57) ABSTRACT

A method for measuring concentricity of one cylindrical member arranged in a second cylindrical member includes the steps of inserting a tool in the second cylindrical member, moving a first set of elements carried by the tool into engagement with the inner surface of the bore, establishing a "zero" position for the first set of elements, measuring for each element the distance of movement from the "zero" position of that element to the position where that element engages the inner surface of the bore. The method further entails adjusting the position of first cylindrical member relative to the second member within a tolerance range based on the distances measured from the "zero" positions.

20 Claims, 5 Drawing Sheets

CONCENTRICITY SENSOR AND METHODS OF USE AND APPLICATION

FIELD OF THE DISCLOSURE

The present disclosure relates to a concentricity sensor, a method of measuring concentricity of one cylindrical element inserted within another, and to the use of such measurements to adjust of the position of the two cylindrical elements relative to one another to achieve concentricity of the two elements.

BACKGROUND OF THE DISCLOSURE

Arrangements for securing aircraft cargo doors in their openings using latch pins and latch cams have been known for many years. These arrangements typically include a latch pin mounted within a latch fitting that is secured to the threshold of the cargo door opening. The latch cam is mounted to the door. When the cargo door is closed, the latch cam captures the latch pin. When the latch cam is rotated about the latch pin axis, the latch cam is pulled into tight fit with the latch pin, and the cargo door is secured in the door opening.

To properly secure a door within an opening using one or more latch mechanisms, it is desirable to mount each latch fitting at the door opening such that the latch pin, which is inserted in and carried by the latch fitting, is uniformly arranged concentrically within each of the latch cams. This is to insure that each of the latch fittings, latch pins, and latch cams carries an equal load.

Concentricity of a latch pin relative to the bore within a latch cam is particularly important when using a plurality of latch fittings and latch cams. Such an arrangement typically is used to secure aircraft cargo doors within the door openings. The problem of how to determine concentricity between a latch pin and a latch cam "within an allowable tolerance" has always existed. Determinations such as these generally require access to the latch fittings once they are secured to the door opening.

On some aircraft, the design of the cargo door and the door opening provided adequate access to the fittings when the door was closed. To determine whether a latch pin and latch cam were separated by an appropriate gap, a mechanic merely slid a feeler gauge around the latch pin. If the gauge didn't clear, the mechanic would be able to visually determine why not. On other aircraft, such as a Boeing 777, the access is limited and other measuring methods were required. Structures prevent a mechanic from having sufficient access to take measurements on the fittings, and while the measurements are possible, they are very time consuming to obtain and not very accurate.

A device and method are therefore needed to measure the concentricity of one member, such as a latch pin, relative to a second member, such as a latch cam, to enable adjustment of the mounting device for the one member so that any deficiency in concentricity can be easily corrected, regardless of the lack of physical space to work within.

SUMMARY OF THE DISCLOSURE

In one aspect of the disclosure, a tool for determining concentricity between a sleeve and a rod to be arranged within the sleeve includes a body portion having a major axis and housing an array of elements constrained for linear motion therealong, a nose portion configured for insertion into the bore of the sleeve and including extendable probe pins for engaging the inner surface of the sleeve, the probe pins being arranged normal to one another and being movable into a first extended position in which the free end of each pin is engaged with the sleeve inner surface, each probe pin being movable into the first position by movement of a respective array of elements in the body portion in a first direction parallel with the major axis, locking elements carried by the housing body, each locking element being engagable with one element of each array of elements for locking the array and hence the pins in an extended position, and a measuring mechanism for measuring the distance that the pins have been extended from a zero extension position.

In another aspect of the disclosure, a method for measuring concentricity of one cylindrical member arranged in a second cylindrical member includes inserting a tool in the second cylindrical member, moving a first set of elements carried by the tool into engagement with the inner surface of the second cylindrical member, establishing a "zero" position for the first set of elements, and measuring for each element the distance of movement from the "zero" position of that element to the position where that element engages the inner surface of the bore. The method further includes a step of adjusting the position of the first cylindrical member relative to the second member within a tolerance range based on the distances measured from the "zero" positions.

Apparatus for concentrically positioning a cylindrical rod within a cylindrical sleeve, includes a tool including a first tool portion having a longitudinal axis and being insertable within the bore of the sleeve, a pair of pin elements reciprocably supported by the first tool portion for movement into and out of engagement with the inner surface of the sleeve, a second tool portion defining a longitudinal axis that is perpendicular to the longitudinal axis of the first tool portion, the second tool portion housing a set of elements that move along the axis of the second tool portion in response to the movements of the pair of pin elements, a first assembly of components for measuring the distance traveled by pin elements from a first position where the pin elements are completely retracted within the first tool portion to a second position where the pin elements engage the bore of the outer sleeve, and a set of components for adjusting the position of the cylindrical rod relative to the cylindrical sleeve, the second assembly including first elements for shifting the position of the fitting vertically relative to the support, and second elements for shifting the position of the fitting horizontally relative to the support.

Further aspects of the apparatus and the method of using the apparatus are disclosed herein. The features as discussed above, as well as other features and advantages of the present disclosure will be appreciated and understood by those skilled in the art from the following detailed description and drawings.

DETAILED DESCRIPTION OF THE DISCLOSURE

Embodiments of the present invention now will be described more fully hereinafter with reference to the accompanying drawing. However, many different embodiments are contemplated and the present disclosure should not be construed as limited to the embodiments set forth herein; rather, these embodiments are provided so that this disclosure will be thorough and complete and better convey the scope of the disclosure to those skilled in the art.

In its broadest sense, this disclosure presents an apparatus and method for determining adjustments required to maintain concentricity between a cylindrical sleeve and a cylindrical element that fits within the sleeve.

This disclosure further presents an apparatus and method for determining whether a latch rod, mounted in a fitting at the threshold of a door opening, is concentrically received in a latch cam mounted to the door. The door is of the type that permits access to the interior of a container, such as a cargo compartment in an aircraft. Taking into account the aircraft and the size of the access door, it is desirable to achieve concentricity between the latch rods and the latch cam devices because it may be necessary to employ a multiplicity of latch cam devices in order to hold the door shut, and each of the latch cam devices must support a desired proportion of the load required to hold the door shut. The latch cam devices are typically arranged so that there is a nominal gap between the latch pin and the latch cam device. In an aircraft in flight, the latch cam device abuts against the latch pin and takes load to hold the door shut under pressurization. It is desirable for each of the latch cam devices to carry an equally distributed share of the load in order to hold the door shut. If only one of the latch pins comes in contact with a respective latch cam device, then the one pin that is touching the latch cam will carry all of the load and possibly fail. The purpose of the disclosed apparatus, therefore, is to quickly and accurately determine the existence of a clearance gap between the latch rod and its respective latch cam device on initial installation of the latch fitting. The best way to do this is to initially arrange the latch rods concentric to the latch cams. A desirable "target" setting is twenty five thousandths of an inch (0.025") nominal radial gap between the pin and the cam for every fitting.

One benefit of this design is that the latch cams have no rotational load placed on them during normal pressurization and flight, and therefore have no tendency to rotate back around and come unlatched. It is common for multiple latch fittings to be used on each of the cargo doors. In the case of at least one aircraft, there are eight latch fittings on the cargo door. In order for all of the latch pins and cams to carry approximately the same load, it is necessary that each of the pins and cams be "concentric". In other words, the centerline of the pin and the centerline of the cam should "ideally" be coincidental. Since it is not possible to build perfect structure and have perfect alignment with man-made items, small "gaps" are allowed to exist between the pin and the cams. The "gaps", for example, are typically on the order of 0.025 inch.

An aircraft 10 (FIG. 1) is shown having a cargo compartment 12 with a cargo compartment door 14 configured for closing a cargo compartment opening 16. The door 14, which is shown in an opened position, includes a plurality of linearly spaced apart latch cam fixtures 3 (shown in greater detail in FIG. 3) arranged at spaced locations along the edge of the door. Each latch cam fixture 3 is configured to engage and mate with a respectively positioned latch pin fixture 22 mounted to the bottom edge of the opening. The door fixtures and the latch cam fixtures engage with one another when the door is moved into a closed position with respect to the opening. When the door is closed, each of the latch cam fixtures 3 are securely fastened about a respective latch pin element carried by a latch pin fixture 22 mounted to the bottom edge of the opening.

Figures 1, 2:
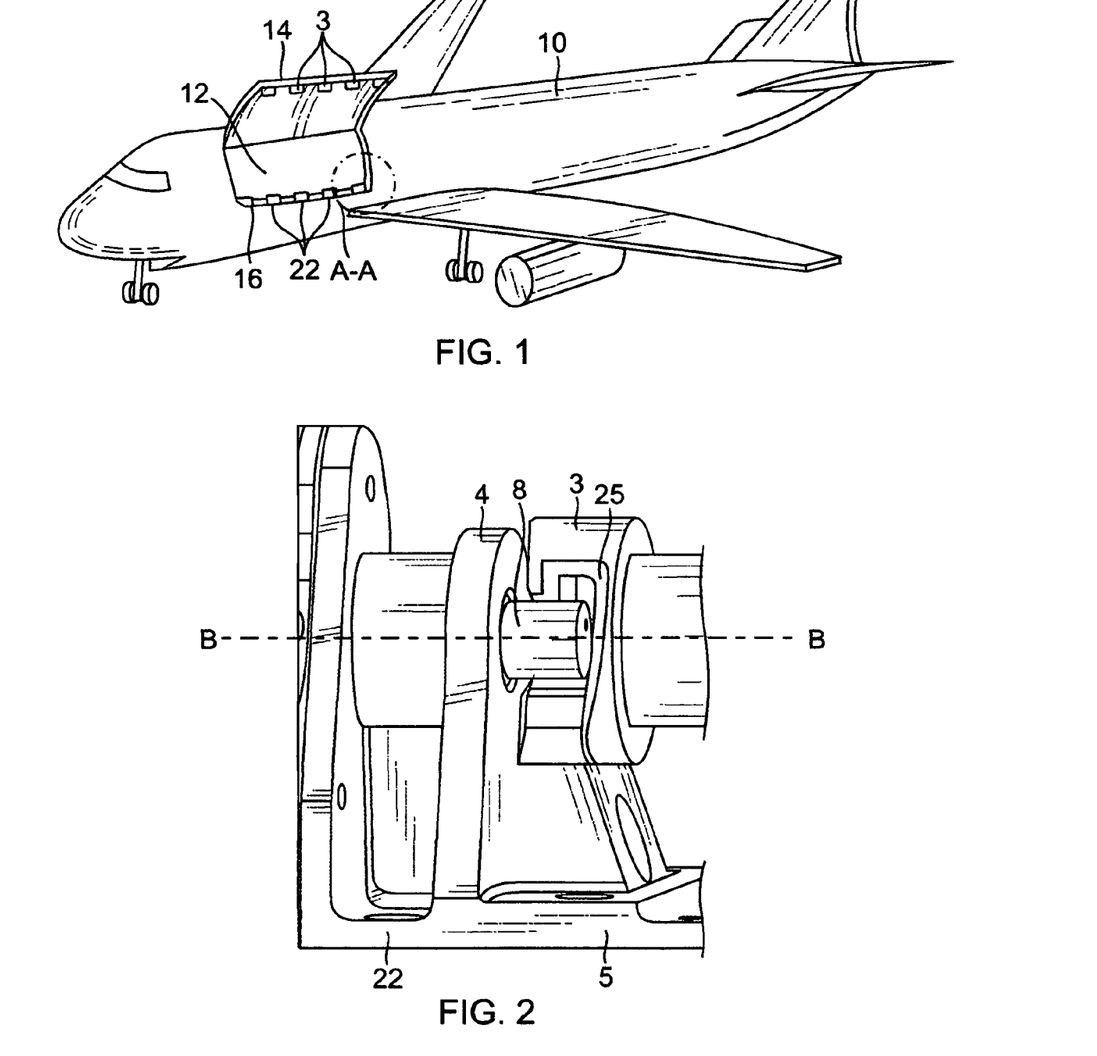
FIG. 1 shows an aircraft with an opening 16 to a cargo compartment 12 and a cover or door 14 for closing the compartment.
FIG. 2 shows a close-up of one latch pin supported by a latch fitting positioned within the bore of a latch cam located in the circle of interest A-A shown in FIG. 1.
Figure 3:
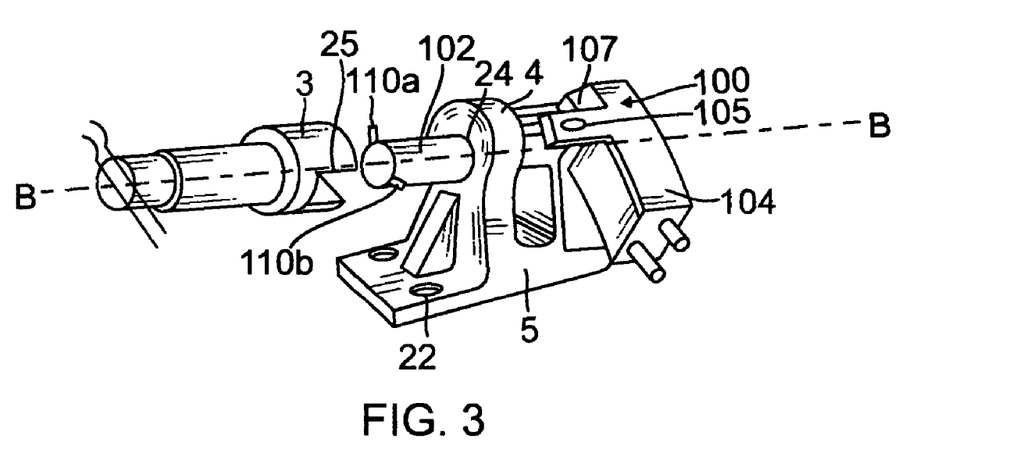
FIG. 3 shows a mechanical embodiment of the tool of the disclosure inserted in the bore of the latch fitting 22 shown in FIG. 2.

Referring as well to FIG. 3, there is shown one latch pin fixture 22 and one latch cam fixture 3 in the circle of interest A-A indicated in FIG. 1. The latch pin fixture 22 is mounted to the bottom edge of the compartment opening 16 shown in FIG. 1. Each latch pin fixture includes an upper portion 4 having a cylindrical through-bore arranged concentrically about an axis B-B that extends in a direction parallel with the bottom edge of the opening, and a lower portion 5 that is bolted to the bottom edge of the compartment opening. Normally, the bore in the portion 4 of the latch fixture 22 concentrically carries a latch pin 8 (shown in FIG. 2). For each latch pin carried by a latch fixture 22, there is a corresponding latch cam 3 mounted on the aircraft door 14. The latch cam 3 is configured as an elongated rod having, at the end that is positioned adjacent the latch pin when the cargo compartment door is closed, a centrally disposed, concentric, elongated internal bore. Access to the internal concentric bore is obtained via a lateral opening 25 (note FIG. 2) configured and of sufficient size to receive the latch pin 8. The surface of the opening 25 is configured as a helical surface with the larger part of the helix arranged at the lateral opening 25. The helical surface enables the latch pin 8 to be drawn into the bore as the latch cam is rotated about the axis B-B. Thus, when the compartment door 14 is closed, the latch pin 8 is received in the lateral opening of the latch cam bore, and as the latch cam is rotated about the axis B-B, the latch pin 8 rides the helical surface until it is drawn into and resides concentrically within the bore. The latch pin does not contact the interior surface of the bore when in its fully captured position because the latch pin 8 is maintained concentrically in the bore within an acceptable tolerance. Only at full aircraft pressurization would it be possible for a latch cam to make contact with the latch pin and take load.

Figure 4:
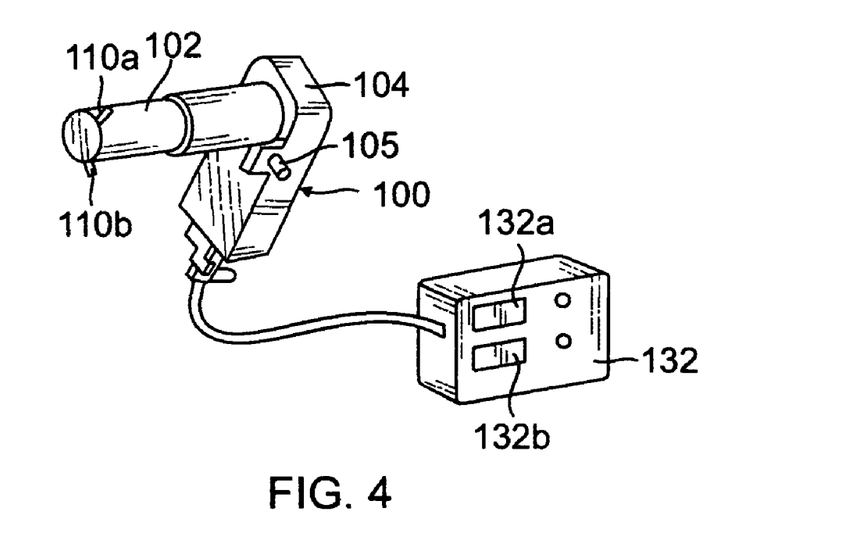
FIG. 4 shows a digital embodiment of the tool of the disclosure connected with a meter for taking a reading.

FIGS. 3 and 4 depict (not drawn to scale) a concentricity tool or sensor 100 according to the present disclosure. The sensor has a nose portion 102 and a body portion 104. The body portion 104 is preferably elongated and substantially rectangular with a longitudinal axis so as to function as a handle, and the nose portion 102 of the sensor 100 is elongated and cylindrical, and extends substantially perpendicular to the body portion 104. An indexing member 105 is supported on an indexing arm 107. The arm 107, which is arranged parallel to the longitudinal axis (coincident with axis B-B) of the nose portion of the tool, is provided to prevent rotation of the tool once the nose portion has been inserted into the latch fixture. Protruding from the end of the nose portion 102 opposite the body portion 104 are a pair of displacement sensor pins 110a, 110b.

The sensor shown in FIG. 3 is a "mechanical" measuring device housing an array of mechanically engaged elements that cooperate together to perform measurements and provide a mechanical output, the functioning of which will be described below in detail. The sensor shown in FIG. 4 is a "digital" measuring device housing mechanical and digital elements that cooperate together to provide a digital output that can be viewed on a visual display device, such as the display device 132, having separate displays 132a, 132b for showing measured values derived from each respective one of the sensor pins. The sensor of FIG. 3 will first be described with a description of the sensor of FIG. 4 to follow below. The outward appearance of the body portion of the two embodiments is essentially the same. The components housed within the two measuring devices include similar first sets of members and dissimilar second sets of members, yet the second set of members in the mechanical embodiment of the tool can be interchanged with the second set of members in the digital embodiment of the tool.

In both embodiments of the sensor, the two pin elements 110a, 110b extend radially outwardly of the nose portion 102 of the tool and project through respective apertures (not numbered) arranged circumferentially about, and disposed in, the nose portion. The pin elements 110a, 110b are arranged relative to one another approximately 90 degrees apart. Preferably the pin elements are disposed axially about the longitudinal axis B-B of the cylindrical nose portion (see FIG. 3). It is noted here that each of the pin elements has been given a separate identity (denoted by the letters "a" and "b") because each of the pin elements are functionally interconnected with a separate array of interconnected elements that are housed within the tool body and nose portions. It is to be further noted that each of the pin elements 110a, 110b and their respectively identified array of functionally interconnected elements define a separate conveyor of motion. Each conveyor of motion defines its own separate motion path, and one conveyor of motion is totally unaffected by the other conveyor of motion. Further, it is to be noted that all numbered elements bearing the same letter designator are part of one of the two arrays of interconnected elements carried by the tool.

Figure 5:
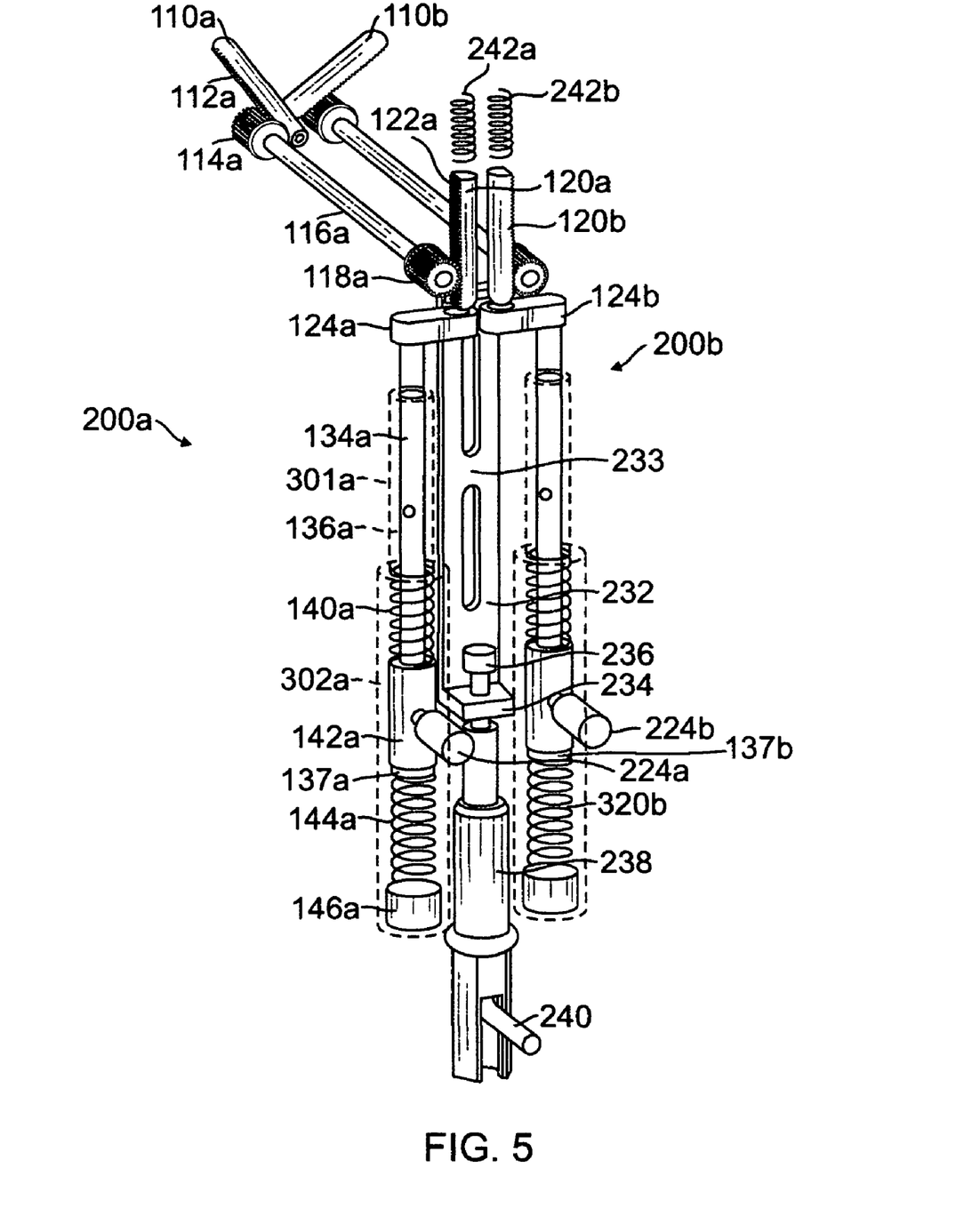
FIG. 5 is a perspective view of elements housed within the mechanical embodiment of the tool of the disclosure.

FIG. 5 is an isometric view of the array of elements 200a, 200b that are housed within the mechanical embodiment of the tool shown in FIG. 3. This array of elements 200a, 200b cooperatively interacts to cause the extension and retraction of the pin elements 110a, 110b out of and into, respectively, the nose portion 102 of the tool. The components of the arrays 200a and 200b are identical, and therefore only one array 200a will be described in detail.

As shown in FIG. 5, the pin element 110a has a portion that is configured as an elongated rack, and includes a surface on one side thereof having a set of gear teeth 112a (the features of the pin element 110b are not shown herein, but are identical with the features of pin element 11 0a, including its own rack having a set of gear teeth). The set of gear teeth 112a engages a first gear element 114a that is mounted to a first end of a shaft 116a, and the gear element rotates as the shaft on which it is mounted rotates. The second, opposite end of the shaft 116a is provided with a second gear element 118a which engages a respective second rack element 120a. The second rack element has an array of teeth 122a on one surface thereof for engagement with gear element 118a. The shaft 116a extends along the longitudinal axis of the sensor nose portion that is coincident with axis B-B (see FIG. 3), extending between the nose portion and the body portion. The shaft 116a therefore transfers the radially reciprocatable motion of the probe pin 110a, out of or into the nose portion, from the nose portion of the tool to the body portion.

Inside the body portion, the second rack element 120a engages an L-shaped slide element 124a that translates along the longitudinal axis of the body portion toward and away from the gear element 118a. As shown in FIG. 5, the longitudinal axis of the body portion is substantially perpendicular to the longitudinal axis of the nose portion. The slide element 124a abuts the upper end of a push rod 134a which is contained within a cylindrical housing or sleeve 136a.

It should be noted here that the push rod 134a is one element of a subassembly of components housed in the sleeve 136a that transfer motion to and from the slide element 124a. The subassembly of components in the mechanical embodiment of the sensor is different from the subassembly of components in the digital embodiment of the sensor, as will become apparent below.

Referring again to FIG. 5, the push rod 134a in the mechanical embodiment of the sensor is one of a set of elements that comprise a "mechanical memory assembly" for establishing a "zero" position for the sensor and for subsequently taking and recording the desired measurements.

In using the sensor tool to make the desired measurements, the slide element 124a moves the push rod 134a in a direction away from the nose portion of the tool. In the mechanical embodiment of the sensor, the slide element 124a engages the top of the push rod 134a, while in the digital embodiment of the sensor (see FIG. 6), the slide element 124a engages the end of the digital probe 334 which causes it to be displaced for recording a measurement in the digital embodiment.

The sleeve 136a includes a first sleeve portion 301a having a length and a first diameter and a second sleeve portion 302a having a second length and a second diameter greater than the first diameter. The second sleeve portion 302a houses a bushing spring 140a, a lock bushing 142a, an extender spring 144a, and an adjustment screw 146a, the latter being located at the end of the sleeve 136a farthest from the slide element. The push rod 134a extends from the slide element 124a through the entire first portion 301a and into about half the length of the second portion 302a.

In the second portion 302a of the sleeve, the bushing spring 140a and the extender spring 144a are positioned on opposite sides of the lock bushing 142a, with the bushing spring being constrained for linear movement about the outer surface of the push rod 134a. The upstream end of the bushing spring is located adjacent to the upstream end of the sleeve second portion 302a. The adjustment screw 146a adjusts the compression of the extender spring 144a so that more or less force can be exerted on the push rod 134a for a purpose described below.

The following describes the manner of use of the mechanical embodiment of the sensor, recalling that movement of the probe pins 110a and 110b are independent of one another, and that they transfer motion back into the body portion of the tool to cause the respective push rods 134a, 134b with which they engage to be moved downward independently of each other. In other words, the probe pins and hence the push rods can be displaced at the same time but by different amounts. Each bushing spring 140a, 140b pushes downwardly (that is, in a downstream direction away from the slide member 124a) on the upper end of a respective bushing 142a, 142b, which in turn slides on its respective push rod 134a, 134b. A machined flange 137a, 137b is provided on the downstream end of each push rod. The flange engages the lower end of the respective bushing 142a, 142b. When a push rod is moved up or down, a respective bushing, carried by the rod, either falls with the rod or moves upwardly while it is seated on the push rod flange. The bushing springs therefore only serve to keep the bushings 142 in contact with the machined flange on the push rods.

The mechanical embodiment of the sensor includes a "memory" mechanism that works by tightening down the locking thumbscrews 224a and 224b against the bushings 142a, 142b (the thumbscrews project through, and are supported by, the body portion of the mechanical embodiment of the tool). Wherever the bushings are located on the push rod when the thumbscrews are tightened down, that is where the bushings are held. Each thumbscrew (FIG. 5) is mounted to a cylindrical sleeve 136a, 136b, and makes threaded engagement with the bushing through an aperture in each respective sleeve. When screwed into its respective cylindrical sleeve aperture, the locking thumbscrew bears against a lock bushing. When the lock bushing is secured by the lock screw in a particular position, the flange on the push rod can only move upwardly until it contacts the lower end of the lock bushing 142a, 142b. The flange can be pulled downwardly by the retractor element 232 to retract the pins 110a, 110b into the nose portion of the tool, but the flange can only come back to the flange. This is what provides the "mechanical memory" feature that is used in making the measurements.

The lock bushing, which is hollow and cylindrical, rides on the push rod, and slides freely up and down inside the sleeves. As a pushrod 134a is depressed by the array of elements associating it with a respective sensor pin 110a, the machined flange on the end of the push rod moves downward. The bushing spring pushes the lock bushing down the sleeve and keeps it against the flange on the push rod. When a measurement is required, the locking thumbscrew is tightened down on the side of the lock bushing to lock it in place wherever it is at that moment. Then the retractor assembly (elements 232, 234, 236) can be moved downwardly by an actuation assembly 240 and the sensor pins 110a, 11b can be pulled simultaneously into the nose of the tool. The lock bushing is locked in place and doesn't move. The push rod 134 then slides within the inside diameter of the lock bushing. The machined flange 137a, 137b on the end of the push rod moves downward away from the end of the locked bushing 142a, 142b. The extender spring is then compressed. The tool is withdrawn from (or later inserted into) the aircraft fitting. When the retractor mechanism is actuated to allow the sensor pins 110a, 110b to extend out of the nose portion, they only extend to the point where they were when the locking thumbscrew was set against the lock bushing. This is because the extender spring that is pushing everything in an upstream direction is now against the end of the push rod which is pushing the sensor pins outward. When the flange on the end of the push rod comes up against the bottom of the lock bushing, which has been locked in place by the locking thumbscrews, the push rod will not move any further and the motion is stopped, and the sensor pins are extended back out of the nose portion of the tool to the exact position at which they were located when the locking thumbscrews were tightened. In effect this constitutes the mechanical "memory" action.

Figure 6:
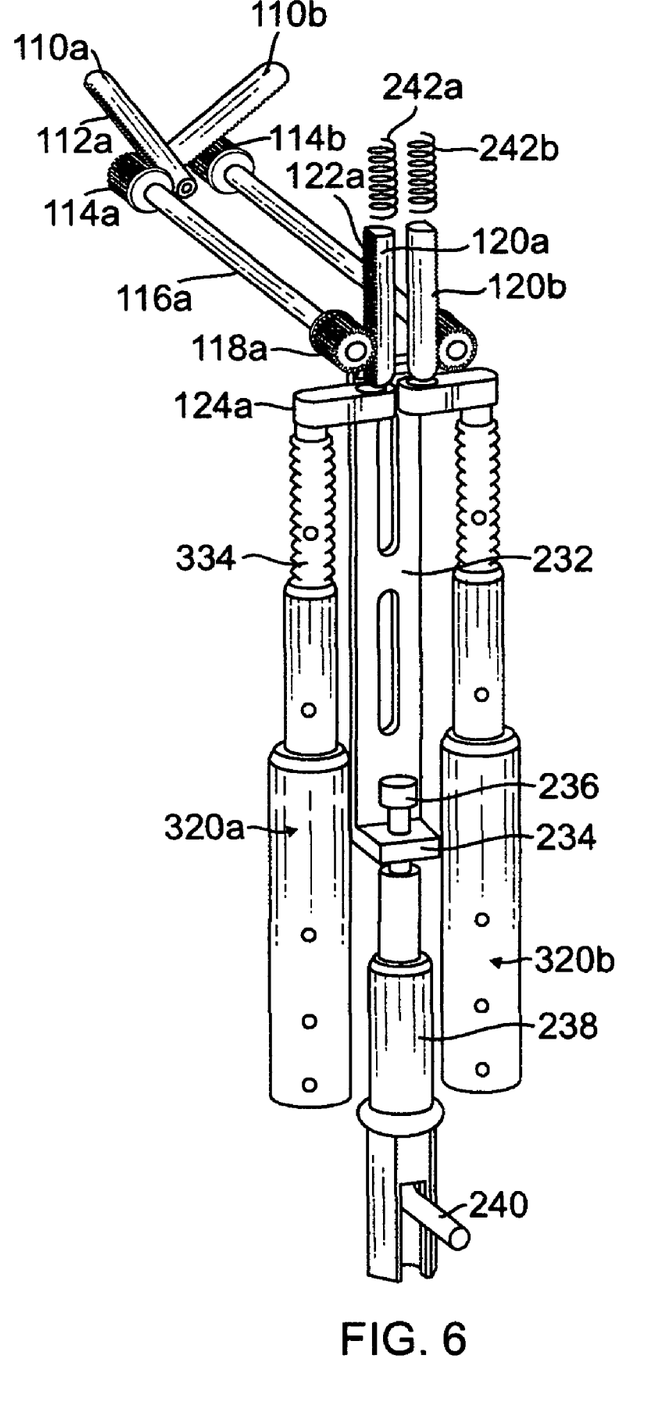
FIG. 6 is a front view of the elements housed within the digital embodiment of the tool of the present disclosure.

As shown in FIGS. 5 and 6, the slide elements 124a and 124b are substantially similarly configured and positioned side-by-side, parallel to, and in mirror image of, one another. The slide elements are constrained for movement in the body portion of the sensor in a direction parallel to the longitudinal extent of the body portion. A retractor plate 232 is mounted substantially centrally of the body portion of the sensor and constrained for reciprocating movement along the longitudinal axis of the sensor body portion. The retractor plate is formed with a body segment 233 that extends from the slide elements through the body portion of the sensor and toward the end of the body portion opposite the slide elements. As shown in FIGS. 5 and 6, a pair of small retractor springs 242a, 242b are mounted in the body portion of the tool above, and in line with, the rack elements 120a, 120b. Each spring bears downwardly against the upper end of a respective rack element 120a, 120b. The retractor plate 232 is formed at one end with a lip that extends normal to the body segment and is engaged with the slide elements 124a, 124b, and at its opposite end with a flange 234 that is normal to the body segment 232. The flange 234 extends in the same direction as, and is parallel to, the lip. The flange 234 engages with a head portion 236 of a retractor handle 238. At the end of the retractor handle opposite the head portion 236 is a retractor gripping element 240. The gripping element is attached to the body segment at a pivot that permits a user to rotate the gripping element out of the plane of the body segment into a first position in which the gripping element is normal to the body segment. Pulling the pivoted retractor handle downwardly in a direction away from the nose portion causes the retractor plate to move the slide elements downwardly. This, in turn, pulls down on the push rods 134a, 134b (or on the digital probes as seen in FIG. 6, depending on which embodiment is being used), and the extender springs 144a, 144b are compressed. When this happens, compression of the retractor springs 242a, 242b is released, the rack elements 120a, 120b are moved downwardly, and as a result, the pins 110a, 110b are retracted into the nose portion of the tool.

The digital embodiment of the sensor, shown in FIG. 6, is of simpler construction than the mechanical version. The digital elements 320a and 320b in this embodiment of the sensor replace the arrays of mechanical elements, that is, the arrays of elements 134a, 136a, 140a, 142a, 144a, 146a and 134b, 136b, 140b, 142b, 144b, 146b, depicted in the sensor of FIG. 5. Preferably, the digital elements 320a, 320b are electronic devices commonly used to measure distances, such as length of objects or separation between two or more points, and whose electronic output can be observed on a monitor or meter. The output displayed reflects the displacement in thousandths of an inch. "Touch probe" devices of this type can be obtained or ordered from Heidenhain Corporation located at 333 East State Parkway, Schaumburg, Ill. 60173, telephone number 1-800-233-0388.

Use of the tool entails unpacking it and plugging all the leads from the digital elements 320a, 320b into the digital monitor 132 and retracting the sensor pins 110a, 110b inside the nose portion of the sensor using the retractor mechanism. A "zeroing sleeve" (not shown) of a small known internal diameter is placed over the nose portion 102 of the sensor. The sensor pins 110a, 110b are caused to be extended out of the sensor nose portion using the retractor mechanism to bring the sensor pins into engagement with the internal diametric surface of the zeroing sleeve. Next, the power for the digital monitor is turned on, and using the monitor 132, the digital output from the digital probe is zeroed out (that is, the measurement taken when the sensor pins make engagement with the internal surface is noted and regarded as the "zero" position). The sensor pins are retracted back into the nose of the tool and the zeroing sleeve is removed. The sensor is then placed into the bore of a latch fitting 22 on the aircraft door sill. The aircraft cargo door is closed and the latch cam is engaged with the nose portion of the sensor. The sensor pins 110a, 110b are extended radially out of the nose portion of the tool (substantially at right angles to one another) into engagement with the inner diametrical surface of the latch cam. A reading is taken using the digital monitor. The readings are then recorded within the digital monitor, after which the pins 110a, 110b can be retracted, and the sensor can be removed from the fitting bore.

Figure 7:
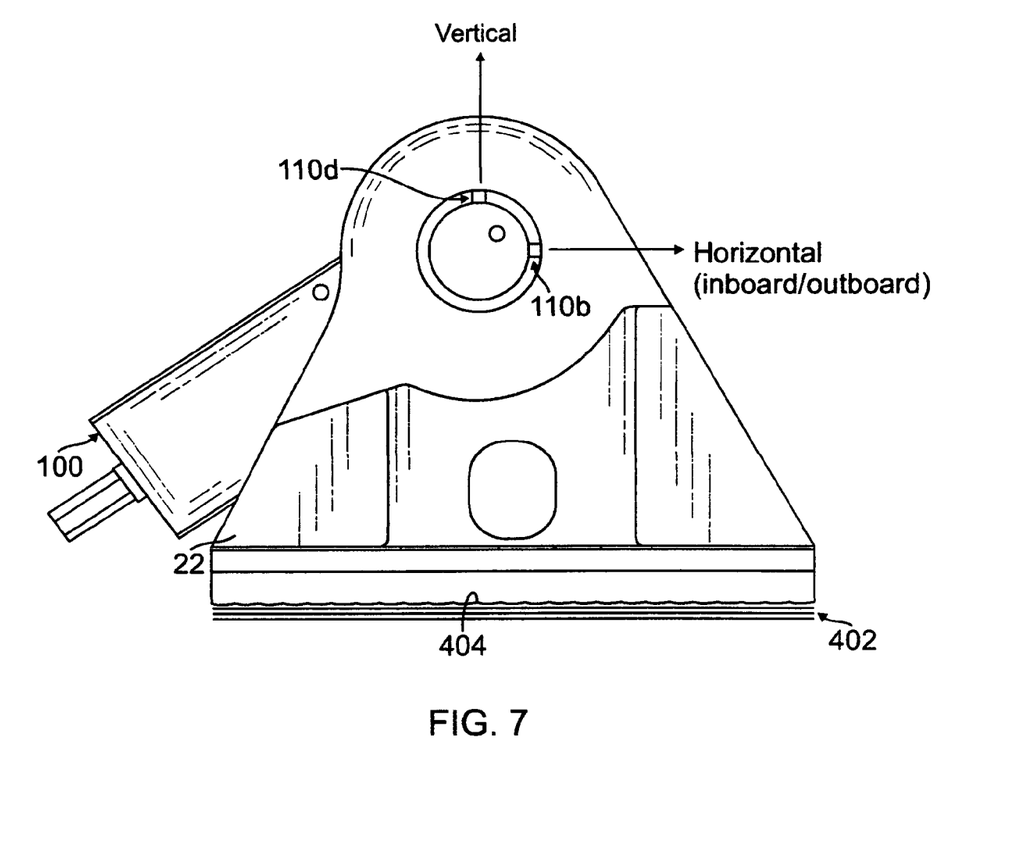
FIG. 7 is a cross sectional view of the latch fitting, the latch cam, and the nose portion of either of the embodiments of the tool of the present disclosure.

The readings that are taken can be used to adjust the location of the latch fitting relative to the latch cam. In FIG. 7, it can be seen that one of the sensor pins (for example, pin 110b) is parallel to the plane of the sill and the other sensor pin (pin 110a) is disposed at 90 degrees (that is, normal) to the plane of the sill. The sensor pin that measures the "normal" relationship to the sill actually measures the shim "stack up" that is required to obtain the correct vertical location of the latch fitting relative to the latch cam. By adding or subtracting shims 402 beneath the latch fitting, the vertical location of the latch fitting can be altered to bring the latch fitting into proper vertical orientation relative to the latch cam on the door. The sensor pin 110*b* that takes a measurement parallel to the plane of the sill determines the location of the latch fitting inboard or outboard relative to the latch cam on the door. When a reading has been taken, the latch fitting can be moved inboard or outboard, on milled serrations 404 in the mounting fittings under the latch fitting, to bring the latch fitting into proper horizontal position relative to the latch cam on the door.

For example, a reading taken using the above described method and the digital monitor might yield a read out of +0.040" on the vertical axis and a read out of −0.030" on the horizontal axis. This would indicate that a 0.040" shim needed to be removed from under the latch fitting and the latch fitting had to be moved outboard 0.030".

While the disclosure has been made with reference to a preferred embodiment, it will be understood by those skilled in the art that various changes may be made and equivalents may be substituted for elements thereof without departing from the scope of this disclosure. In particular, the present disclosure provides for an array of elements that defines two motion paths that are independent of each other, thus allowing for simultaneous measurement in two axes. In addition, the present disclosure allows for a mechanical "memory" such that measurements can be recorded by the disclosed sensor, and permits ready replacement of various mechanical components with electronic digital components to export the measurement to an electronic monitoring device. Many modifications can be made to adapt a particular situation or material to the teachings of the disclosure without departing from the essential scope thereof Therefore, it is intended that this disclosure not be limited to the particular embodiment disclosed as the best mode contemplated for carrying out this invention, but that the disclosure will include all embodiments falling within the scope of the appended claims.

The invention claimed is:

1. A tool for determining concentricity between a sleeve and a rod to be arranged within the sleeve, comprising:
   a body portion having a major axis and housing an array of elements constrained for linear motion therealong,
   a nose portion having a major axis and extending from said body portion and configured for insertion into the bore of the sleeve and including independently extendable probe pins for engaging the inner surface of the sleeve, the probe pins being arranged normal to one another and being movable in a direction radially outward from said nose portion into a first extended position in which the free end of each pin is engaged with the sleeve inner surface, each probe pin being movable into said first position by movement of a respective independent array of elements in the body portion in a first direction parallel with the body portion major axis,
   locking elements carried by the body portion, each said locking element being engagable with one element of each array of elements within said body portion for locking the array and hence the pins in an extended position, and
   a measuring mechanism carried by the body portion for determining the distance that the pins have been independently extended from a zero extension position based on a measured movement of at least one element of each array of elements.

2. The tool of claim 1, wherein said array of elements in said body portion includes a first biased sub-array operatively coupled with a first probe pin and a second biased sub-array operatively coupled with a second probe pin, said first and second probe pins being supported by said nose portion normal to each other, and said first and second sub-arrays being movable independently of each other.

3. The tool of claim 2, wherein said first probe pin comprises a gear rack and said first sub-array includes a first rotatable rod having a gear on one end operatively coupled with said first probe pin rack and a gear on the other end operatively coupled with the array of elements in said body portion, and said second probe pin comprises a gear rack and said second sub-array includes a second rotatable rod having a gear on one end operatively coupled with the array of elements in said body portion.

4. The tool of claim 3, wherein said first and second arrays of elements in the body portion of the tool include motion transferring elements engaging the gears on the other end of a respective one of the first and second rotatable rods.

5. The tool of claim 4, wherein said body portion further includes a longitudinally translatable, centrally disposed bracket having a portion engaging with said motion transferring elements, first and second arrays of elements in the body portion comprising motion measuring components for determining amount of motion traveled by the probe pins.

6. The tool of claim 4, wherein said motion measuring components comprise two sets of mechanical elements for providing mechanical output correlating with the amount of movement of the probe pins.

7. The tool of claim 4, wherein said motion measuring components comprise two sets of electronic elements for providing electronic output correlating with the amount of movement of the probe pins.

8. The tool of claim 4, wherein the nose portion of said tool has a longitudinal axis that is oriented substantially normal to the longitudinal axis of said body portion.

9. The tool of claim 1, where the nose portion is disposed at substantially a right angle to the body portion.

10. The tool of claim 1, wherein each of the probe pins further comprise linkage elements in the nose portion operatively coupling the probe pins with the array of elements in the body portion, each of the linkage elements associated with a respective probe pin including a rotatable rod having one end engaging its probe pin and an opposite end engaging the array of elements in the body portion.

11. The tool of claim 10, wherein the major axis of the nose portion of said tool is disposed at an angle to the longitudinal axis of the body portion, and each rotatable rod extending along the major axis of the nose portion.

12. The tool of claim 11, wherein the rotatable rods are disposed parallel to one another and the probe pins are disposed perpendicular to one another.

13. A method for measuring concentricity of one cylindrical member arranged in a second cylindrical member, comprising:
   inserting a tool in the second cylindrical member, the tool carrying a first set of elements,
   establishing a "zero" position for the first set of elements,
   independently moving each of the first set of elements into engagement with the inner surface of the second cylindrical member, and
   measuring for each element the distance of movement from the "zero" position of that element to the position where that element engages the inner surface of the second cylindrical member.

14. The method of claim 13, and further including a step of adjusting the position of the first cylindrical member relative to the second member within a tolerance range based on the distances measured from the "zero" positions.

15. The method of claim 13, wherein said step of measuring comprises determining the distance of movement from the "zero" position using mechanical elements in said tool.

16. The method of claim 13, wherein the step of measuring comprises determining the distance of movement from the "zero" position using digital elements in said tool.

17. Apparatus for concentrically positioning a cylindrical rod within a cylindrical sleeve, comprising:
(a) a tool including
a first tool portion having a longitudinal axis and being insertable within the bore of the sleeve,
a pair of pin elements reciprocably supported by the first tool portion for radial movement with respect to the first tool portion into and out of engagement with the inner surface of the sleeve,
a second tool portion defining a longitudinal axis that is perpendicular to the longitudinal axis of the first tool portion, said first tool portion extending from said second tool portion, said second tool portion housing a set of elements therein that move along the longitudinal axis of the second tool portion in response to the movements of the pair of pin elements,
a first assembly of components for measuring the distance traveled by pin elements from a first position where the pin elements are completely retracted within the first tool portion to a second position where the pin elements extend from within the first tool portion to engage the bore of the outer sleeve, and
(b) a second assembly of components for adjusting the position of the cylindrical rod relative to the cylindrical sleeve, said second assembly including
first elements for shifting the position of the rod vertically relative to the sleeve, and
second elements for shifting the position of the rod horizontally relative to the sleeve.

18. The apparatus of claim 17, wherein the longitudinal axis of said first portion is arranged at an angle to the longitudinal axis of said second tool portion, and said pin elements are disposed substantially perpendicularly to one another.

19. The apparatus of claim 17, wherein said first tool portion includes two sets of gear elements, each of said sets of gear elements being interconnected with a respective one of said pin elements, each said set of gear elements transferring motion of said respective pin element to one of the sets of elements in said second tool portion, each said set of gear elements defining a motion path along which motion of the pin element is transferred, said motion paths being independent of each other, and said pin elements each comprising a rack element.

20. The apparatus of claim 19, wherein one of said pin elements measures distance between the outer diameter of the cylindrical rod and the inner diameter of said cylindrical sleeve along a vertical axis and the other of said pin elements measures distance between the outer diameter of the cylindrical rod and the inner diameter of said cylindrical sleeve along a horizontal axis, and said first elements for shifting the position of the fitting vertically comprises flat shims that are inserted or deleted from beneath the fitting, and said second elements for shifting the position of the fitting horizontally relative to the support comprise ridges on the shim positioned closest to the underside of the fitting.

* * * * *